United States Patent Office 3,070,749
Patented Dec. 25, 1962

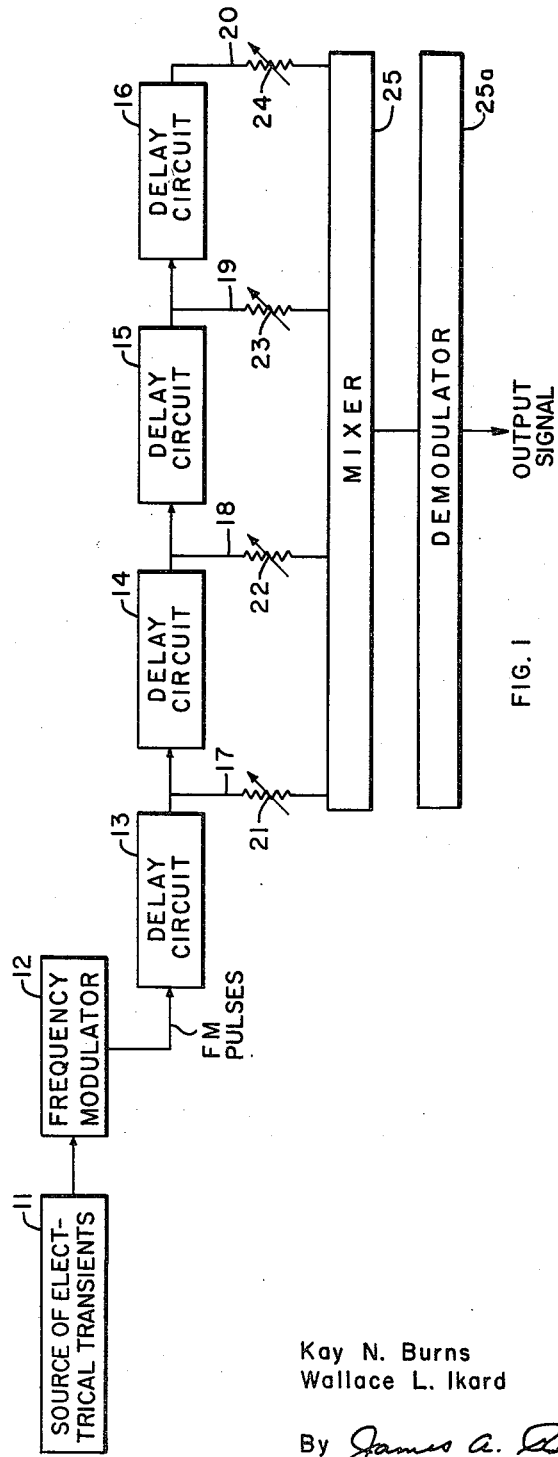

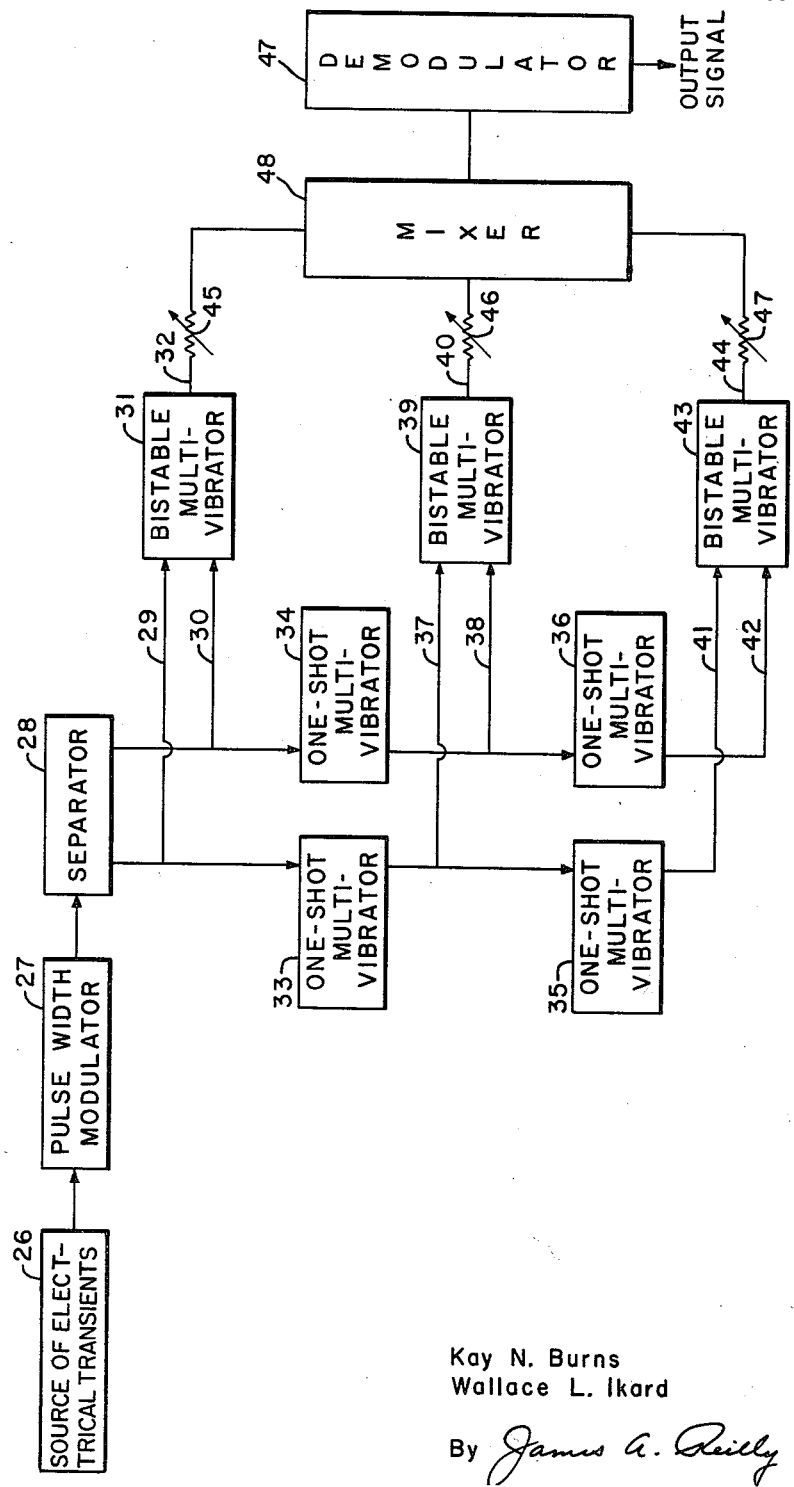

3,070,749
SYSTEM FOR EXTRACTING INFORMATION FROM COMPLEX SIGNALS BY DELAYING PULSES INDICATIVE OF THE CHARACTERISTICS OF SUCH SIGNALS
Kay N. Burns and Wallace L. Ikard, Tulsa, Okla., assignors to Jersey Production Research Company, a corporation of Delaware
Filed Mar. 2, 1959, Ser. No. 796,508
9 Claims. (Cl. 328—177)

The present invention relates to methods and apparatus for the analysis of electrical phenomena and more particularly relates to an improved electronic delay line useful in the time domain filtering of seismic data and electrical transients of similar character.

Recent years have witnessed important advances in the development of electronic data processing systems, particularly systems for the analysis and interpretation of seismic signals and similar complex electrical transients. Not the least of these advances has been the application of time domain methods and apparatus to the processing of seismic information. Such methods and apparatus are considerably more versatile than systems formerly used for this purpose and make possible operations which were considered infeasible in the past. In essence time domain analytical methods for processing seismic information and similar electrical transients involve the extraction of samples of the input information at equal increments of time during the duration of the input signal, the weighting of these extracted samples according to some impulse response which constitutes the desired filter characteristic, and the mixing of the weighted samples to obtain a composite signal. Such an operation is referred to as a time domain operation because it operates on the input information by superposition of all of the past time values of the information, weighting the values in terms of their effect at a later time. Earlier systems of analysis, on the other hand, operated in the frequency domain and were based on the response of the input signal to the various components signal, that is, on the superposition of frequency effects.

Advantages of employing time domain methods and apparatus to the analysis of seismic information reside in the flexibility of time domain systems for creating electrical filters which cannot be obtained with ordinary circuitry, for analyzing time functions for their frequency contents, for correlating one signal with another, for use as variable time delay mechanisms to insert seismic corrections, and for use as nonlinear filter systems to follow the main frequency content of a seismic signal during its entire duration.

The heart of any time domain data processing system is a tapped delay line which will permit the extraction of samples of the input information at regular intervals during the duration of the input signal. In the past, delay lines employed for this purpose have been either rotating magnetic delay lines or lumped constant delay lines. In a rotating magnetic type delay line, the input signal is continuously recorded on a magnetic recording medium carried on a rotating drum. Delayed samples of this recorded information are obtained by means of pickup heads spaced at intervals adjacent to the drum surface. The input signal is erased during each revolution of the drum. Delay lines of this type are advantageous in that they permit a certain amount of flexibility in delay by varying the rotational speed of the drum. Their usefulness is restricted, however, because of limitations as to the number of delay taps which can be used in conjunction with a rotating drum of convenient size. A lumped constant delay line consists of a series of lumped constant components provided with delay taps at periodic intervals. Delay lines of this type are generally less satisfactory than rotating magnetic delay lines in time domain applications because their frequency response becomes unduly limited when long delay periods and large numbers of delay taps are required.

The present invention provides an electronic delay line suitable for use in time domain data processing applications which is relatively free of the disadvantages which have characterized the rotating magnetic delay lines and the lumped constant delay lines used in such applications in the past. In one embodiment of the delay line of the invention, electronic one-shot multivibrators or similar devices are employed to delay an input signal which has been converted by means of a frequency modulator into a series of pulses of very short duration occurring at a rate proportional to the input signal level. In an alternate form of the delay line, pulse width modulation is utilized to generate the input pulses. Each pulse thus generated triggers a one-shot multivibrator or similar device whose delayed output triggers the next multivibrator, so that any original pulse in the input signal will occur at regular intervals as the signal proceeds along the chain of multivibrator circuits. The delay obtained with each multivibrator will, of course, depend upon the multivibrator reset time.

The principle of the electronic delay line of the invention is the same regardless of whether the original input signal is converted to a frequency modulated or pulse width modulated signal. If pulse width modulation is employed, however, both the leading and the trailing edge of the pulse signal must be kept in register and it is therefore necessary to provide two series of one-shot multivibrators, one for the leading index pulse and one for the trailing index pulse. The pulse width waveform is reconstructed from the tapped delay point outputs by feeding the leading and trailing index pulses at each delay point into a bi-stable multivibrator where they are combined.

The exact nature and objects of the invention can be more fully understood by referring to the following detailed description of methods and apparatus useful in the practice of the invention and to the accompanying drawings.

Referring now to the drawing:

FIGURE 1 represents diagrammatically a time domain unit including an electronic delay line employing one-shot multivibrators or similar delay circuits for the extraction of samples from a frequency modulated input signal at regularly delayed intervals; and, FIGURE 2 is a schematic representation of a time domain unit including a delay line operating upon a pulse width modulated signal in accordance with the invention.

Turning now to FIGURE 1 of the drawing, reference numeral 11 designates a source of electrical transients which may comprise a seismic signal or any other random signal from which it is desired to extract sample information at delayed intervals by means of the electronic delay line of the invention. In seismic applications of the delay line, source 11 will normally constitute a magnetic recording playback system and amplifier but it will be appreciated that signals from other systems of similar character may also be utilized. The signal thus introduced into the system is fed from source 11 into frequency modulator 12 of conventional design where it is converted into a series of pulses of very short time duration whose rate is proportional to the input signal level. Any of a number of frequency modulator circuits familiar to those skilled in the art may be employed to create this pulse signal.

The pulsed output from frequency modulator 12 is then fed into the first of a series of one-shot multivibrators, designated in FIGURE 1 by reference numerals 13, 14, 15 and 16. Although for the sake of simplicity only four multivibrators are shown in FIGURE 1, it will be understood that for most applications of the delay line of the invention it will be desirable to employ a greater number of multivibrators in order that a device having greater overall delay characteristics may be provided. A typical delay line of the invention intended for use in seismic application may, for example, contain as many as 250 or more individual one-shot multivibrators in series. One of the outstanding advantages of the delay line of the invention is that a large number of such delay devices may be employed without encountering the disadvantages of unwieldly size and low frequency response which have characterized rotating magnetic delay lines and lumped constant delay lines employed in the past.

One-shot multivibrators 13, 14, 15 and 16 employed in the delay line of the invention are conventional capacitively coupled relaxation oscillators so arranged that the circuitry is in an unoscillating state and a trigger circuit is required to initiate each cycle of operation. An output pulse is thus generated at a delayed time in response to each input pulse. Such multivibrators, also frequently referred to as one-shots or flip-flops, are well known circuits widely employed in a variety of electronic applications and will be familiar to those skilled in the art. Other circuits which will accomplish the same purpose, phantastrons, blocking oscillators and the like, may also be used. The multivibrators, flip-flops or similar devices employed may have reset periods ranging from as little as $1/10$ of a millisecond up to as high as 5 milliseconds. Since the reset period must be shorter than the period between the pulses to be delayed, the exact period will depend in part upon the modulation system used. For seismic applications of the delay line, it will generally be preferred to employ multivibrators having delay or reset periods of from 1 to about 3 milliseconds. As pointed out earlier, all of the multivibrators should have uniform reset periods. The output of each multivibrator is sampled by means of a delay tap. These delay taps are designated in FIGURE 1 by reference numerals 17, 18, 19 and 20.

Each pulse in the frequency modulated signal fed into multivibrator 13 triggers the multivibrator and causes it to discharge. A signal sample is then obtained by means of delay tap 17. This delayed output of multivibrator 13, which occurs after an interval determined by the reset period of the multivibrator, one millisecond for example, in turn triggers multivibrator 14 and a second signal sample is recovered by means of delay tap 18. The frequency modulated input signal thus proceeds through the entire series of multivibrators, signal samples being extracted at delayed intervals, and thus the array of multivibrators functions as an electronic delay line. The output of each multivibrator, consisting of a constant amplitude, constant width pulse for each pulse of the frequency-modulated carrier, can be demodulated by conventional means to recover the original input signal.

The electronic delay line thus described may be utilized as a simple but effective time domain filter unit by merely providing attenuator controls to weight the delayed samples recovered by means of delay taps 17 through 20 and thereafter combining the weighted samples by means of conventional mixing and demodulating circuitry. As indicated in FIGURE 1, weighting of the samples may be accomplished by means of variable resistors 21, 22, 23 and 24 or by other conventional components of similar character. The attenuated outputs from the multivibrators may be mixed by connecting the outputs to the appropriate points in a mixer 25 or similar component. Mixers suitable for purposes of the invention are described on pages 629 through 648 of "Waveforms" by Chance et al. published as vol. 19 of the Massachusetts Institute of Technology Radiation Laboratory Series by McGraw-Hill Book Company, New York, New York (1949). In place of variable resistors 21 through 24 and mixer 25, a mixing resistor string may be used to weight and mix the delayed samples simultaneously. As will be appreciated by those skilled in the art, a mixing resistor string is simply an adding network which includes a series of resistors for varying the weightings applied. In a system of the latter type the resistors employed for weighting purposes will be much larger than the mixing resistors in order to prevent interaction of the weighting. These and other aspects of the circuitry described above in connection with FIGURE 1 of the drawing will be readily understood by those skilled in the art. Conventional means, indicated by reference numeral 25a in FIGURE 1, may be employed for demodulating of the output signal to remove carrier frequency components if desired. Methods and apparatus for demodulating frequency-modulated signals are discussed at pages 210 through 215 of "Modulation Theory" by Harold S. Black, published by Van Nostrand Company, Inc. in 1953 and will be familiar to those skilled in the art.

The use of a pulse width modulated signal in place of the frequency modulated signal previously described above in the delay line of the invention is shown in FIGURE 2 of the drawing. In this embodiment of the invention, electrical transients are fed into the system from a source designated by reference numeral 26. As before, the input transients may comprise a seismic signal derived through the playback and amplification of a magnetic recording obtained during seismic prospecting or any other random signal from which it is desired to extract information by means of the electronic delay line. The input signal from source 26 is first fed into pulse width modulator 27 where it is converted by means of a suitable modulating wave into a series of pulses having discrete leading and trailing edges, the leading edges of the pulses preferably occurring at regular intervals, and the duration of each pulse being proportional to the level of the input signal. Conventional pulse width modulation circuitry suitable for performing this function will be readily apparent to those skilled in the art.

The output of pulse width modulator 27 passes into conventional pulse separator 28 where the leading and trailing index pulses of the wave are separated, this normally being necessary in order that the leading and trailing edges may be operated upon separately. Samples of the leading and trailing index pulse outputs from the separator are then taken off through taps 29 and 30 and introduced into a bi-stable multivibrator 31 where they are combined in order to reconstruct the pulse width wave form. This bi-stable multivibrator is a circuit having two stable states which requires both the leading index pulse and the trailing index pulse to trigger it for a complete cycle. Such multivibrators employ conventional circuitry and are widely known as scale of two circuits or Eccles-Jordon trigger circuits. The output of multivibrator 31 obtained by means of tap 32 is an undelayed pulse width wave.

The first delayed sample of the modulated input signal is obtained in the apparatus of FIGURE 2 by feeding the leading and trailing index pulses separately into two one-shot multivibrators, designated by reference numerals 33 and 34. These multivibrators or flip-flops are of a type similar to those earlier described and perform in identical manner. The delayed impulses from the multivibrators, representing the leading and trailing index pulses, are then passed to the next succeeding pair of multivibrators 35 and 36. Samples of these delayed impulses are extracted through taps 37 and 38 and introduced into bi-stable multivibrator 39 to obtain the delayed samples in the form of a reconstructed pulse width modulated wave via tap 40. In similar manner, additional delayed samples are derived by means of taps 41 and 42, bi-stable multivibrator 43 and tap 44. Again it will be understood that although only a comparatively few delay points are shown in FIGURE 2, it will ordinarily be desired to make provisions for many more delay points in order to render the delay line of greatest usefulness. Similarly, it will also be apparent that the reset times of the multivibrators may be modified considerably depending upon the particular function which it is intended that the delay line shall perform. The output of bistable mulitvibrators 31, 39, 43, being constant amplitude, constant repetition rate pulses whose width is proportional to the level of input signal 26, can be demodulated by conventional means to recover the original input signal. Methods and apparatus suitable for the demodulation of pulse with modulated signals are described at pages 276 and 277 of "Modulation Theory" by Harold S. Black, published by Van Nostrand Company, Inc. in 1953.

It will be recognized that certain modification in the delay line described in the preceding paragraphs can be made if the repetition rate of the pulse width modulated signal employed is such that the pulses occur at intervals corresponding to the reset values of the one-shot multivibrators. An example of this occurs when the modulated signal is repetitious at a rate of 1000 cycles per second and the reset time of each multivibrator is one millisecond. In such a case, the leading edge index pulses occur at the same rate that the multivibrators pass impulses and thus passage of the leading index pulse through the multivibrators is unnecessary. The leading index pulse may therefore be passed directly to the bi-stable multivibrators in such a situation. It is however, nonetheless necessary to pass the trailing index pulse through one-shot multivibrators in such a system in order to keep the leading and trailing index pulses in register. In most instances such a combination of pulse repetition rate and multivibrator reset value will not be encountered.

The pulse width modulated delay lines described above, like the frequency modulated system earlier described, may be utilized as a time domain filtering unit by weighting, mixing and demodulating to remove carrier frequency components of the delayed samples obtained therefrom. Again attenuation of the individual outputs from bi-stable multivibrators 31, 39, 43 and the like may be accomplished by means of variable resistors 45, 46 and 47 or by similar equipment, the attenuation employed depending upon the impulse response which constitutes the desired filter characteristics. Mixing and demodulation may be carried out by means of conventional mixing and demodulation components, designated by reference numerals 48 and 49, which will be familiar to those skilled in the art. The filtered composite signal thus obtained may be rerecorded as a variable density or variable color photographic trace or may be processed by other conventional techniques.

It will be understood that many modifications in the invention herein described may be made without departing from the inventive concept thereof. It is therefore intended that the scope of the invention be limited only by the appended claims.

What is claimed is:

1. Apparatus for recovering samples from a complex electrical signal which comprises a signal modulator for converting said signal into a series of pulses indicative of the amplitude of said signal; a plurality of delay circuits connected in cascade to said modulator, each of said delay circuits being responsive to an input pulse for the production of an output pulse at a delayed time; and delay taps from the outputs of said delay circuits.

2. Apparatus as defined by claim 1 wherein said signal modulator is a frequency modulator.

3. Apparatus as defined by claim 1 wherein said signal modulator is a pulse width modulator.

4. An electronic delay line which comprises a frequency modulator circuit for converting a random electrical input signal into a series of pulses whose rate is proportional to the input signal level; a plurality of one-shot multivibrators connected in cascade to the output of said modulator circuit, the reset times of said multivibrators being uniform and of shorter duration than the time interval between adjacent pulses from said frequency modulator circuit; and taps for recovering delayed signals from at least one of said multivibrators.

5. A delay line as defined by claim 4 which is provided with means for weighting and combining the signals obtained from said taps.

6. A delay line as defined by claim 5 including means for demodulating the combined signals.

7. An electronic delay line which comprises a pulse width modulator circuit for converting a random electrical input signal into a series of pulses occurring at predetermined intervals, a separator for resolving each of said pulses into a leading index pulse and a trailing index pulse, a plurality of one-shot multivibrators connected in series to the leading index pulse output of said separator, a plurality of one-shot multivibrators connected in series with the trailing index pulse output of said separator, and bi-stable multivibrator means for combining delayed outputs from multivibrators connected to said leading index pulse output with corresponding delayed outputs from multivibrators connected to said trailing index pulse output.

8. A delay line as defined by claim 7 additionally provided with means for weighting and mixing outputs from said bi-stable multivibrators.

9. Apparatus for processing data in the time domain which comprises in combination a frequency modulator circuit for converting an input electrical signal into a series of impulses whose frequency is proportional to the amplitude of said input signal; a plurality of resetting delay circuits connected in cascade to the output of said frequency modulator circuit, each of said delay circuits having a uniform reset period which is shorter than the time interval between adjacent impulses from said frequency modulator circuit; delay taps for recovering a delayed signal from each of said delay circuits; and means for weighting, mixing and demodulating said delayed signals from said delay taps.

References Cited in the file of this patent

UNITED STATES PATENTS

| | | |
|---|---|---|
| Re. 24,790 | Feissel | Mar. 8, 1960 |
| 2,402,916 | Schroeder | June 25, 1946 |
| 2,421,606 | Fitch | June 3, 1947 |
| 2,435,598 | Oliver | Feb. 10, 1948 |
| 2,486,391 | Cunningham | Nov. 1, 1949 |
| 2,516,888 | Levy | Aug. 1, 1950 |
| 2,605,423 | Bess | July 29, 1952 |
| 2,606,289 | Stanton | Aug. 5, 1952 |
| 2,662,116 | Potier | Dec. 8, 1953 |
| 2,701,841 | Frederick | Feb. 8, 1955 |
| 2,722,602 | Pawley | Nov. 1, 1955 |
| 2,755,381 | Woodcock | July 17, 1956 |
| 2,784,910 | Ghiorso et al. | Mar. 12, 1957 |
| 2,836,719 | Manhart | May 27, 1958 |
| 2,841,638 | Rieke | July 1, 1958 |
| 2,876,058 | Kenosian et al. | Mar. 3, 1959 |
| 2,903,584 | Jaffe et al. | Sept. 8, 1959 |
| 2,916,724 | Peterson | Dec. 8, 1959 |
| 2,932,547 | Swan | Apr. 12, 1960 |
| 2,954,465 | White | Sept. 27, 1960 |
| 2,956,261 | Grossling | Oct. 11, 1960 |